(12) United States Patent
Smith (10) Patent No.: US 10,367,344 B2
(45) Date of Patent: Jul. 30, 2019

(54) CABLE ARMOR STOP

(71) Applicant: Bridgeport Fittings, Inc., Stratford, CT (US)

(72) Inventor: Lawrence J. Smith, Stamford, CT (US)

(73) Assignee: Bridgeport Fittings, Incorporated, Stratford, CT (US)

( * ) Notice: Subject to any disclaimer, the term of this patent is extended or adjusted under 35 U.S.C. 154(b) by 0 days.

(21) Appl. No.: 15/043,029

(22) Filed: Mar. 2, 2016

(65) Prior Publication Data

US 2017/0256931 A1  Sep. 7, 2017

(51) Int. Cl.
*H02G 15/00* (2006.01)
*H02G 3/04* (2006.01)

(52) U.S. Cl.
CPC ........... *H02G 15/00* (2013.01); *H02G 3/0481* (2013.01)

(58) Field of Classification Search
CPC .............................. H02G 15/00; H02G 3/0481
USPC .......................................................... 174/665
See application file for complete search history.

(56) References Cited

U.S. PATENT DOCUMENTS

| | | | |
|---|---|---|---|
| 1,816,668 A | | 7/1931 | Church |
| 2,490,253 A | | 12/1949 | Buchanan |
| 2,506,398 A | | 5/1950 | Thomas, Jr. |
| 2,600,371 A | | 6/1952 | Bergan |
| 2,657,251 A | * | 10/1953 | Bergan ................. H02G 3/0683 174/654 |
| 3,006,981 A | * | 10/1961 | Weber .................. H02G 3/0683 174/541 |
| 3,052,748 A | * | 9/1962 | Curtiss ..................... H01R 4/64 174/41 |
| 3,369,071 A | * | 2/1968 | Tuisku ................... H02G 3/065 174/650 |
| 3,384,393 A | * | 5/1968 | Horton ................. H02G 3/0616 174/665 |

(Continued)

FOREIGN PATENT DOCUMENTS

DE 202005021930 U1 8/2011

OTHER PUBLICATIONS

"Zinc Die Cast Saddlegrip Snap-Tite MC Cable Connector with Insulated Throat," GraybaR, graybar.com, accessed: Sep. 2015; http://www.graybar.com/store/en/gb/zinc-die-cast-saddlegrip-snap-tite-mc-cable-connector-with-nsulated-throat; whole document.

(Continued)

*Primary Examiner* — Timothy J Thompson
*Assistant Examiner* — Rhadames Alonzo Miller
(74) *Attorney, Agent, or Firm* — Ware, Fressola, Maguire & Barber LLP (57) ABSTRACT

A cable armor stop for preventing cable sheathing of an electrical cable from passing the armor stop while allowing electrical conductors of the electrical cable to pass therethrough has a body with an outer shell, the body having an interior cavity formed by an interior surface of the body, the cavity extending through the body between a front side of the body and a rear side of the body, the cavity reduced by a radially protruding member extending inwardly such that a terminating end of the radially protruding member is spaced a distance from an opposite side of the interior surface closest to the terminating end, the distance being less than a minimum outside diameter of the cable sheathing of said electrical cable. An electrical connector including such a cable armor stop.

28 Claims, 12 Drawing Sheets

(56) References Cited

U.S. PATENT DOCUMENTS

| | | | | |
|---|---|---|---|---|
| 3,667,783 | A * | 6/1972 | Sotolongo | H02G 3/0616 174/665 |
| D243,405 | S * | 2/1977 | Mooney | D13/149 |
| 4,021,604 | A * | 5/1977 | Dola | H02G 3/0616 174/51 |
| 4,885,429 | A * | 12/1989 | Schnittker | H02G 3/0691 174/668 |
| 4,990,721 | A * | 2/1991 | Sheehan | H02G 3/0666 174/660 |
| 5,266,050 | A * | 11/1993 | O'Neil | H02G 3/0625 174/659 |
| 5,315,684 | A | 5/1994 | Szegda | |
| D360,188 | S * | 7/1995 | Kiely | D13/152 |
| 5,731,543 | A * | 3/1998 | Jorgensen | H02G 3/0691 174/661 |
| 5,789,706 | A * | 8/1998 | Perkins | H02G 3/0691 174/135 |
| D404,362 | S * | 1/1999 | Auray | D13/152 |
| 6,020,557 | A * | 2/2000 | Jorgensen | H01R 13/745 174/650 |
| 6,034,326 | A * | 3/2000 | Jorgensen | H02G 3/0691 174/660 |
| 6,043,432 | A * | 3/2000 | Gretz | H02G 3/0691 16/2.1 |
| 6,080,933 | A * | 6/2000 | Gretz | H02G 3/0691 16/2.1 |
| 6,162,995 | A * | 12/2000 | Bachle | H02G 15/04 174/151 |
| 6,194,661 | B1 * | 2/2001 | Gretz | H01R 13/745 174/153 R |
| 6,299,485 | B1 | 10/2001 | Marik | |
| 6,335,488 | B1 * | 1/2002 | Gretz | H02G 3/0691 16/2.1 |
| 6,354,851 | B1 | 3/2002 | Bachle | |
| 6,682,355 | B1 * | 1/2004 | Gretz | H02G 3/0691 174/663 |
| 6,848,834 | B1 | 2/2005 | Roehrs et al. | |
| 6,849,803 | B1 * | 2/2005 | Gretz | H02G 3/0691 16/2.1 |
| 7,075,007 | B2 * | 7/2006 | Auray | F16L 5/00 174/656 |
| 7,154,054 | B1 * | 12/2006 | Gretz | H02G 3/0666 16/2.1 |
| 7,205,489 | B2 * | 4/2007 | Auray | H01R 4/646 174/650 |
| 7,226,309 | B1 * | 6/2007 | Gretz | H01R 13/5808 174/660 |
| 7,238,894 | B1 * | 7/2007 | Gretz | H02G 3/0666 16/2.1 |
| 7,304,251 | B1 * | 12/2007 | Gretz | H02G 3/0691 174/653 |
| 7,307,218 | B2 | 12/2007 | Van Den Berg et al. | |
| 7,347,401 | B1 * | 3/2008 | Gretz | F16L 3/222 248/68.1 |
| 7,381,088 | B1 * | 6/2008 | Gretz | H01R 13/5804 174/661 |
| 7,390,979 | B1 * | 6/2008 | Johnson | H02G 3/0691 16/2.1 |
| 7,390,980 | B1 * | 6/2008 | Gretz | H02G 3/06 16/2.1 |
| 7,442,079 | B1 * | 10/2008 | Gretz | H02G 3/0691 174/661 |
| 7,485,806 | B1 * | 2/2009 | Gretz | H02G 3/0666 174/135 |
| 7,488,905 | B2 * | 2/2009 | Kiely | H01R 13/745 174/650 |
| 7,495,184 | B1 * | 2/2009 | Gretz | H01R 13/5812 16/2.1 |
| 7,576,290 | B1 * | 8/2009 | Korcz | H02G 3/0691 16/2.1 |
| 7,723,623 | B2 * | 5/2010 | Kiely | F16L 5/00 174/650 |
| 7,824,213 | B1 * | 11/2010 | Korcz | H01R 13/5816 174/64 |
| 7,854,627 | B1 * | 12/2010 | Gretz | 439/557 |
| 8,124,891 | B1 * | 2/2012 | Gretz | H02G 3/0691 164/137 |
| 8,476,541 | B1 * | 7/2013 | Kiely | H02G 3/081 174/656 |
| 8,622,768 | B2 | 1/2014 | Van Swearingen et al. | |
| 8,791,374 | B1 | 7/2014 | Smith | |
| 2005/0121211 | A1 * | 6/2005 | Diggle, III | H02G 1/085 174/19 |
| 2005/0218284 | A1 * | 10/2005 | Kurrasch | A47G 1/20 248/303 |
| 2005/0269122 | A1 * | 12/2005 | Pyron | H02G 3/0691 174/666 |
| 2007/0017688 | A1 * | 1/2007 | Pyron | H01R 13/5219 174/59 |
| 2010/0084854 | A1 * | 4/2010 | Sathyanarayana | H02G 3/0691 285/84 |
| 2011/0290550 | A1 * | 12/2011 | Kiely | H02G 3/0691 174/480 |
| 2012/0024597 | A1 * | 2/2012 | Jafari | H02G 3/0691 174/665 |
| 2014/0262486 | A1 * | 9/2014 | Korcz | H05K 5/0247 174/520 |

OTHER PUBLICATIONS

"Arlington Industries Snap2It Connectors with Insulated Throat," CableOrganizer.com, Dec. 23, 2008; https://web.archive.org/web/20081223042736/http://cableorganizer.com/arlington-industries/snap-2it-connectors.html; whole document.

"NEER C550," McNaughton-McKay, mc-mc.com, accessed: Sep. 2015; https://www.mc-mc.com/2497818/Product/Appleton_Group_C550; whole document.

* cited by examiner

CABLE ARMOR STOP

TECHNICAL FIELD

A cable armor stop for preventing cable sheathing of an electrical cable containing electrical conductors from passing the armor stop while allowing electrical conductors of the electrical cable to pass therethrough.

BACKGROUND OF THE INVENTION

In the electrical fitting art, electrical connectors have typically been used for terminating an armor clad (AC) cable or a metal clad (MC) cable to an electrical panel box or the like. Such AC and MC cables can contain electrical conductors with different sizes. The number of electrical conductors can also vary. For example, an AC/MC cable can have three number 12 size conductors, four number 14 size conductors, etc. Underwriter Laboratories Standard UL 514B requires that any listed AC/MC cable fitting (electrical connector) must prevent the armor cable sheathing associated with the cable from entering the throat (exit) of the fitting, that is, to prevent the sheathing from passing the electrical connector and thereby entering the electrical panel box to which the electrical connector is connected via a locknut or other locking device. This cable sheathing is typically stopped by a change in inside diameter of the connector itself or via a cable armor stop associated with the connector which allows the electrical conductors to pass through the connector, but which prevent the cable sheathing from passing through the connector by contacting the throat of the connector, for example.

A problem arises when an electrical connector is designed for a nominal range of AC/MC cable sizes (for example, a range from 0.420-0.610 inch) and the actual cable sheathing outer diameter is slightly below the minimum nominal range (for example, a cable sheathing having an outer diameter of 0.395 inch). Such variation in an MC/AC cable is not unusual and therefore, when such a situation arises, the manufacturer of such electrical connectors either has to add another electrical connector to its product line which has a smaller inside diameter or use a cable armor stop with a smaller inside diameter (for example, 0.380 inch). However, if the electrical connector or cable armor stop has a smaller inside diameter so as to prevent the cable sheathing from passing, problems can arise with respect to having sufficient space for passage of the cable's electrical conductors through such an electrical connector. In some situations, such reduction in the electrical connector or the cable armor stop associated with the electrical connector makes it extremely difficult to handle the largest size cable in the AC/MC range, because the smaller inside diameter of the electrical connector or cable armor stop effectively impedes the smooth passage of the larger and sometimes more numerous electrical conductors within the AC/MC cable. As such, the smaller inside diameter of the electrical connector or cable armor stop poses a significant problem for installations requiring larger size cables with large diameters and/or more numerous electrical conductors as compared to smaller size cables.

Thus, there has been a need in the industry to accommodate the variation in cable sheath outer diameter size, while providing sufficient space for the electrical conductors associated with a particular AC/MC cable to easily pass through the electrical connector. The present invention is directed to a solution to this problem.

SUMMARY OF THE INVENTION

The present invention relates to a cable armor stop for preventing cable sheathing of an electrical cable selected from electrical cables with cable sheathing outer diameters within a minimum and maximum range, from passing said armor stop while allowing electrical conductors of the electrical cable to pass therethrough, the cable armor stop dimensioned for assembly with an electrical connector dimensioned to receive electrical cables having cable sheathing outer diameters within said range, the cable armor stop comprising a body having an outer shell with a cylindrical shape, the body having an interior cavity formed by an interior surface of the body, the cavity extending through the body between a front side of the body and a rear side of the body, the cavity reduced by a radially protruding member extending inwardly such that a terminating end of said radially protruding member is spaced a distance from an opposite side of the interior surface closest to said terminating end, said distance being less than a minimum outside diameter of the cable sheathing of said electrical cable, so as to allow electrical conductors of said electrical cable to pass through said cavity while preventing passage of the cable sheathing.

Another embodiment of the present invention is the cable armor stop as described above, wherein the radially protruding member has a smooth shape.

A further embodiment of the present invention is the cable armor stop as described above, wherein the shape of the radially protruding member does not have small radii that could impede passage or chaffing of electrical conductors.

Another embodiment of the present invention is the cable armor stop as described above, wherein the shape of the radially protruding member is similar to a palatine uvula.

A further embodiment of the present invention is the cable armor stop as described above, wherein the outer shell of the body is formed with an annular groove dimensioned for interfitment with a tongue formed on a U-shaped member of an electrical connector body of the electrical connector so as to secure the cable armor stop to the electrical connector.

A further embodiment of the present invention is the cable armor stop as described above, wherein a perimeter of the interior surface of the body at both the front side and rear side of the body, and a perimeter of the radially protruding member, are smooth so as to minimize abrasion of electrical conductors passing thereby.

Another embodiment of the present invention is the cable armor stop as described above, fabricated from an electrical insulating material.

A further embodiment of the present invention is the cable armor stop as described above, wherein the insulating material is plastic.

A still further embodiment of the present invention is the cable armor stop as described above, wherein the outer shell includes at least two movable tabs dimensioned for insertion within slots formed in an electrical connector body of the electrical connector at one end of the electrical connector body.

Another embodiment of the present invention is the cable armor stop as described above, wherein the cavity of the body is reduced by two radially protruding members with terminating ends of said radially protruding members facing each other and spaced a distance from each other less than said minimum outside diameter of said cable sheathing of said electrical cable.

A further embodiment of the present invention is the cable armor stop as described above, wherein the shape of each radially protruding member is similar to a palatine uvula.

Another embodiment of the present invention is an electrical connector integrally including a cable armor stop for preventing cable sheathing of an electrical cable selected from electrical cables with cable sheathing outer diameters within a minimum and maximum range from passing said armor stop while allowing electrical conductors of the electrical cable to pass therethrough, an electrical connector dimensioned to receive electrical cables having cable sheathing outer diameters within said range, the electrical connector comprising a body having a nipple formed at one end thereof, the nipple including a cable armor stop formed at one end of the nipple, the cable armor stop having a body, the body having an interior cavity formed by an interior surface of the body, the cavity extending through the body between a front side of the body and a rear side of the body, the cavity reduced by a radially protruding member extending inwardly such that a terminating end of said radially protruding member is spaced a distance from an opposite side of the interior surface closest to said terminating ends, said distance being less than a minimum outside diameter of the cable sheathing of said electrical cable, so as to allow electrical conductors of said electrical cable to pass through said cavity while preventing passage of the cable sheathing.

A further embodiment of the present invention is the electrical connector as described above, wherein the electrical connector body has a threaded boss and a slot formed in the body, and the electrical connector has a U-shaped retaining member dimensioned to secure the cable sheathing to the electrical connector body when a fastener is threaded into said boss, with the U-shaped retaining member having a portion passing through said slot.

A still further embodiment of the present invention is the electrical connector as described above, wherein the radially protruding member has a smooth shape.

Another embodiment of the present invention is the electrical connector as described above, wherein the shape of the radially protruding member does not have small radii that could impede passage or chaffing of electrical conductors.

A further embodiment of the present invention is the electrical connector as described above, wherein the shape of the radially protruding member is similar to a palatine uvula.

A still further embodiment of the present invention is the electrical connector as described above, wherein the cavity of the body is reduced by two radially protruding members with terminating ends of said radially protruding members facing each other and spaced a distance from each other less than said minimum outside diameter of said cable sheathing of said electrical cable.

Another embodiment of the present invention is the electrical connector as described above, wherein the shape of each radially protruding member is similar to a palatine uvula.

BRIEF DESCRIPTION OF THE DRAWINGS

For a better understanding of the nature and objects of the present invention, reference is made to the following detailed description taken in conjunction with the following drawings in which:

FIG. 18 is an exploded perspective view of an electrical connector embodiment including an inner locking ring, AC/MC cable, and snap-in cable armor stop associated therewith along with a locknut for securing the electrical connector to a panel box and the like.

FIG. 19 is a perspective view of the assembled electrical connector, AC/MC cable, snap-in cable armor stop and locknut as shown in FIG. 18.

DETAILED DESCRIPTION

FIGS. 1-11 illustrate a first embodiment of a cable armor stop 40 according to the present invention.

Figure 1:
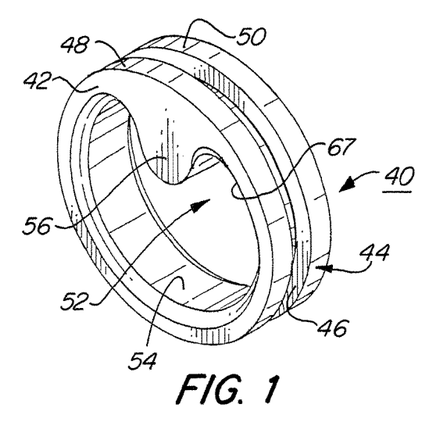
FIG. 1 is a perspective view of a cable armor stop according to a first embodiment of the present invention.
Figure 2:
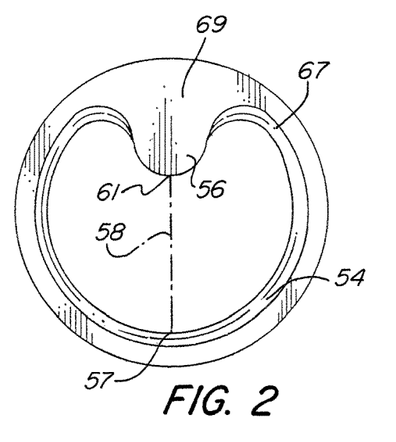
FIG. 2 is a front view of the cable armor stop shown in FIG. 1.
Figure 3:
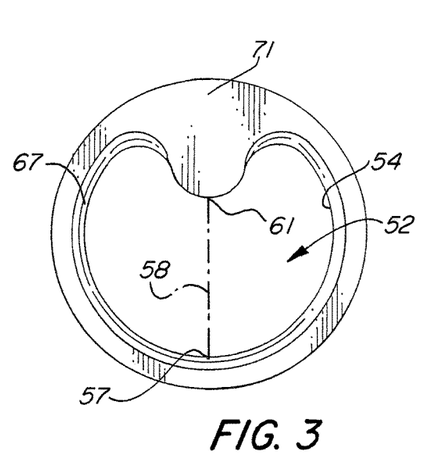
FIG. 3 is a rear view of the cable armor stop shown in FIG. 1.
Figure 4:
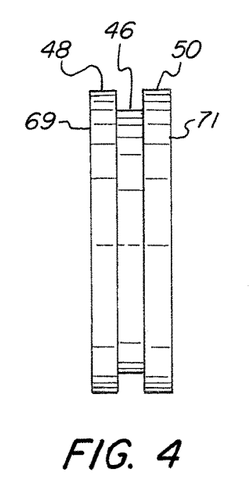
FIG. 4 is a side view of the cable armor stop shown in FIG. 1.
Figure 5:
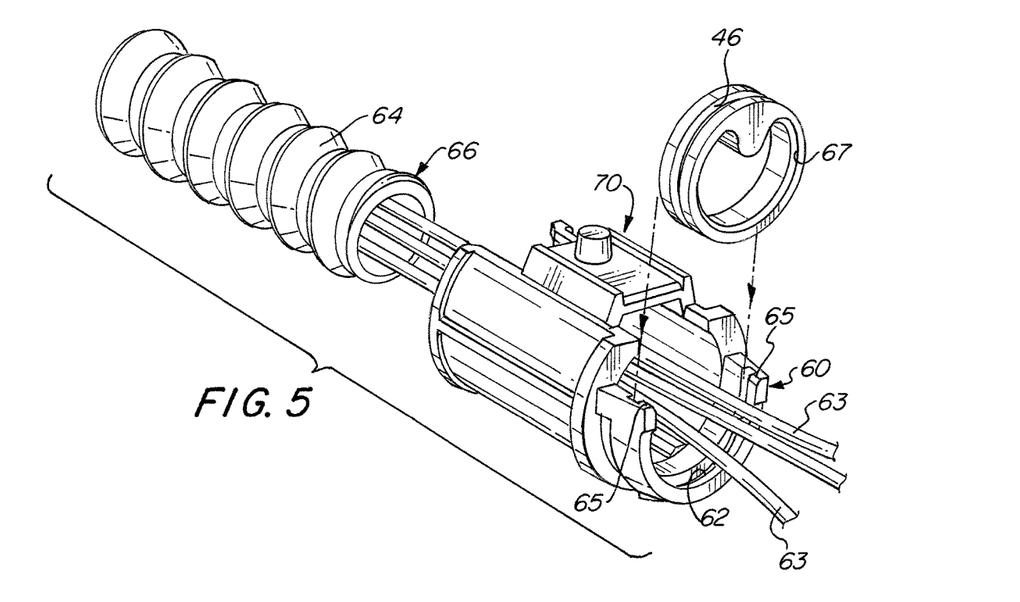
FIG. 5 is an exploded perspective view of an electrical connector (less a spring clip associated therewith in this embodiment of the electrical connector), an AC/MC cable and a cable armor stop according to the present invention, the cable armor stop shown positioned for insertion into the electrical connector body.
Figure 6:
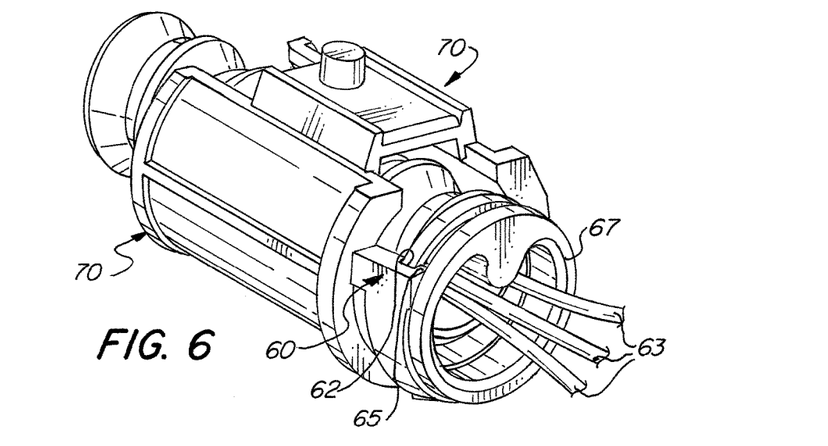
FIG. 6 is a perspective view similar to FIG. 5 showing the cable armor stop inserted into the electrical connector body.
Figure 7:
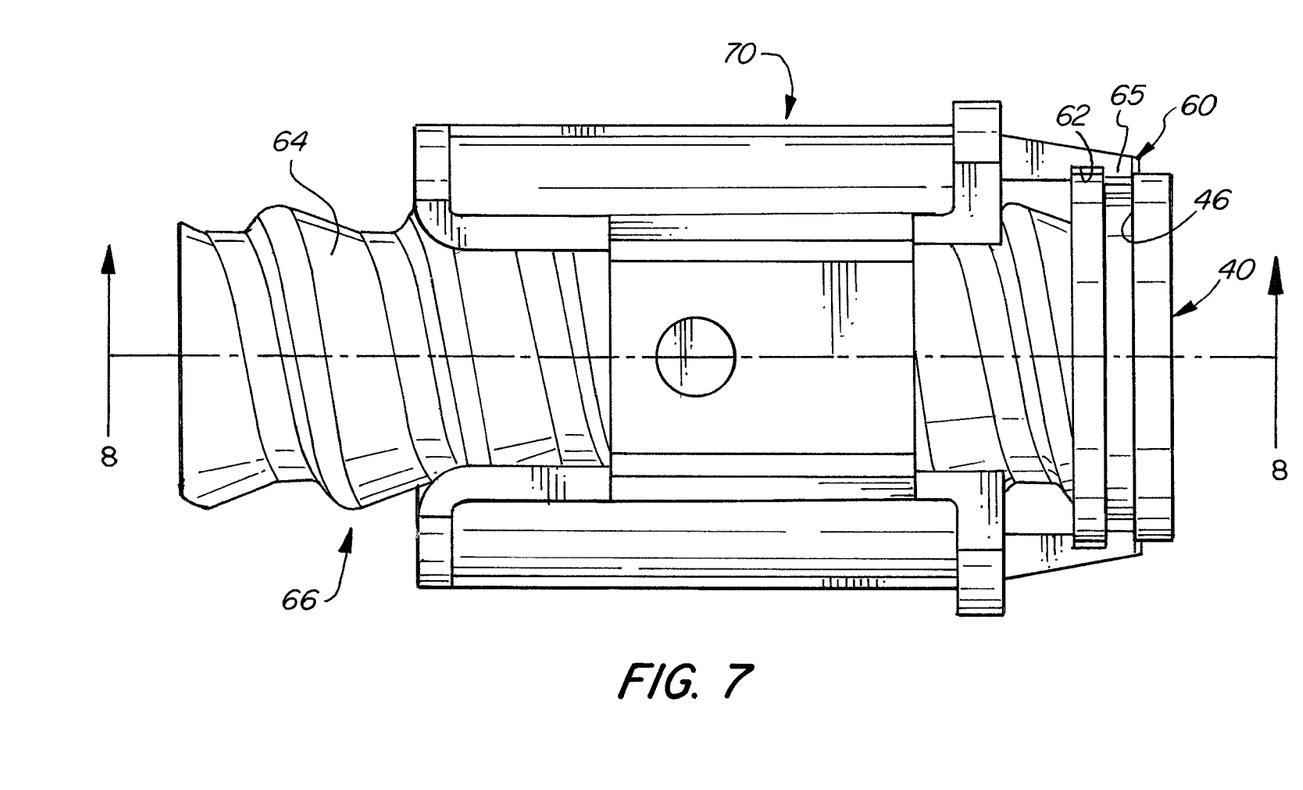
FIG. 7 is a top view of the electrical connector body, AC/MC cable and cable armor stop as shown in FIG. 6.

As seen in FIGS. 1-4, the cable armor stop has a body 42 with an outer shell 44 that has a cylindrical shape. The outer shell contains an annular groove 46 that demarcates outer rims 48 and 50 as best seen in FIGS. 1 and 4. As seen in FIGS. 5 and 6, the annular groove is dimensioned to engage with a corresponding tongue 65 of a U-shaped member 60, which also has an associated groove 62. The U-shaped member is part of an electrical connector body 70. The connector body 70, cable armor stop 40 and a spring clip 75 form an overall electrical connector 79 as seen in FIGS. 8-11.

The spring clip can be secured to connector body 70 by various means, such as by attachment to boss 81 on connector body 70. See applicant's U.S. Pat. No. 8,791,374, hereby incorporated by reference, for other details concerning this connector body, spring clip and other means for attaching the spring clip to the connector body. As discussed below, the armor cable stop according to the present invention is not limited to this particular electrical connector and can be associated with any electrical connector to which the cable armor stop can be attached.

Body 42 has an interior cavity 52 formed by an interior surface 54 of the body. As seen in FIGS. 1, 2 and 3, cavity 52 extends through body 42 between front side 69 and rear side 71 of the body. These figures also show that cavity 52 is reduced by a radially protruding member 56 having a terminating end 61 that is positioned a distance from an opposite side 57 of the interior surface as best shown by phantom line 58 in FIGS. 2 and 3. The radially protruding member thus extends inwardly from the outer shell of the cable armor stop.

Thus, phantom line 58 represents a distance from the opposite side 57 of the interior cavity that is closest to the terminating end 61 of protruding member 56. This distance is dimensioned so as to be less than a minimum outside diameter of cable sheathing 64 of AC/MC electrical cable 66 so as to allow electrical conductors 63 of the cable to pass through cavity 52 while preventing passage of the cable sheathing 64. This is best seen in FIGS. 5-11 as explained more fully below.

FIGS. 1-5, 8 and 10 also show that the radially protruding member 56 and interior surface 54 of the armor cable stop have generally smooth perimeters 67 on both the front side 69 and rear side 71 of cable armor stop 40 which minimize potential abrasion of insulation associated with electrical conductors 63 of associated AC/MC cable 66. The shape of the radially protruding member is also smooth, and can preferably have a shape similar to a palatine uvula. The radially protruding member can have smooth shapes as long as small radii are avoided that could impede passage of electrical conductors, or chaff such electrical conductors.

Figure 8:
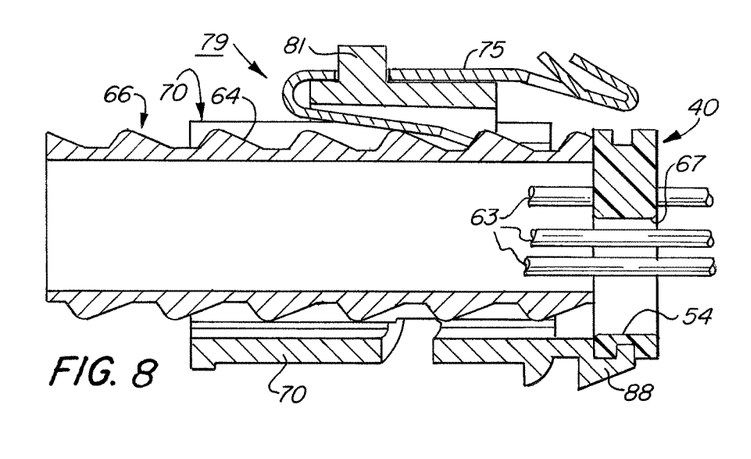
FIG. 8 is a cross-sectional view of the electrical connector, including a spring clip associated therewith in this embodiment of the electrical connector, as well as AC/MC cable and cable armor stop taken along line 8-8 of FIG. 7 (FIG. 7 does not show the spring clip) and showing an AC/MC cable with a maximum outer diameter cable sheathing for installation in the electrical connector, with the sheathing being blocked by the cable armor stop.
Figure 9:
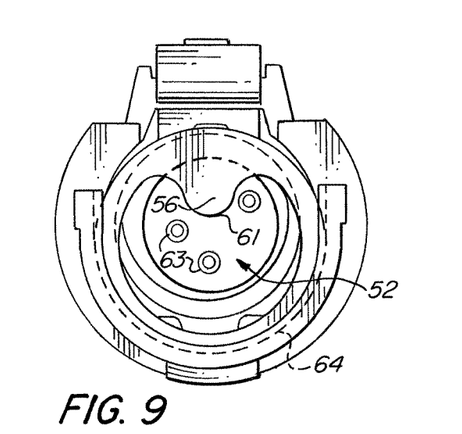
FIG. 9 is a front view of the electrical connector, AC/MC cable and cable armor stop as shown in FIG. 8.
Figure 10:
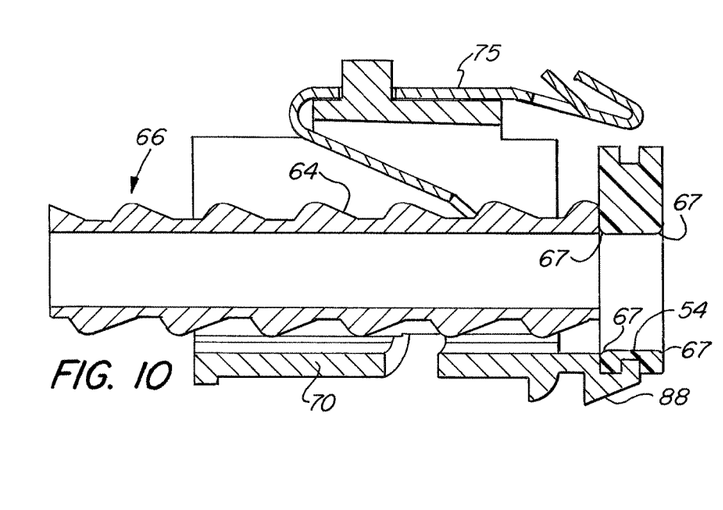
FIG. 10 is a cross-sectional view similar to FIG. 8 showing the electrical connector, AC/MC cable, and cable armor stop and showing the AC/MC cable with a minimum outer diameter cable sheathing for installation in the electrical connector, with the sheathing being blocked by the cable armor stop.
Figure 11:
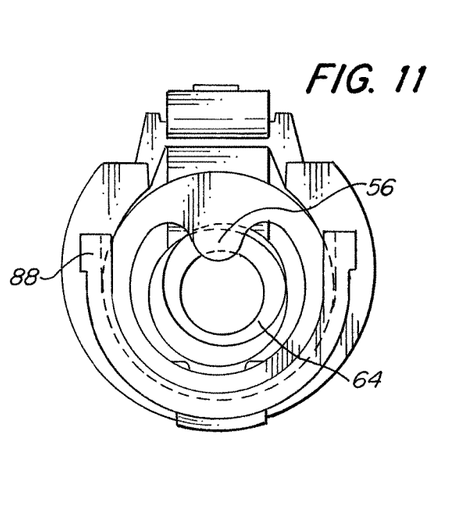
FIG. 11 is a front view of the electrical connector, AC/MC cable and cable armor stop as shown in FIG. 10.
Figure 12:
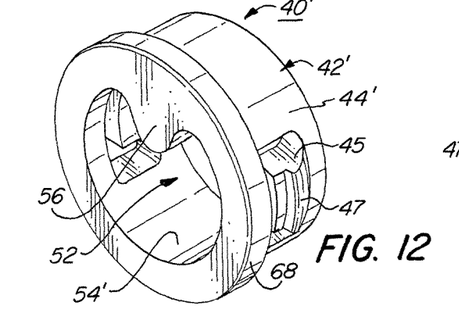
FIG. 12 is a top perspective view of a cable armor stop according to a second embodiment of the present invention.
Figure 13:
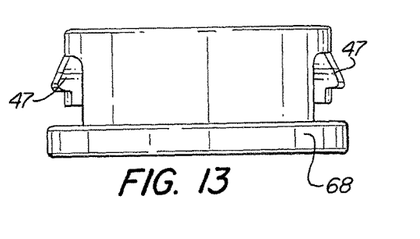
FIG. 13 is a top view of the cable armor stop shown in FIG. 12.
Figure 14:
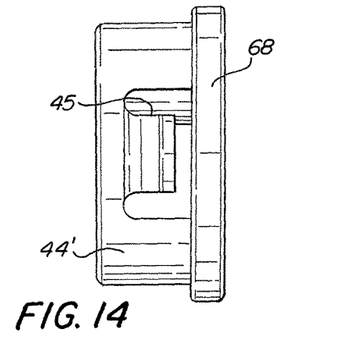
FIG. 14 is a side view of the cable armor stop shown in FIG. 12.
Figure 15:
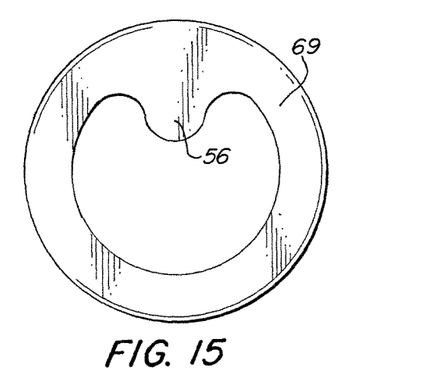
FIG. 15 is a front view of the cable armor stop shown in FIG. 12.
Figure 16:
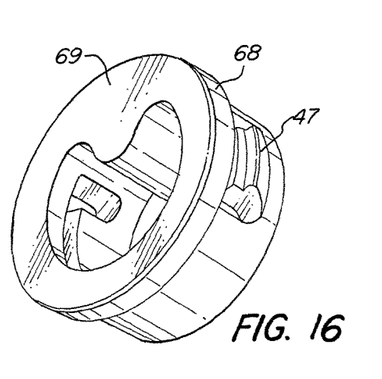
FIG. 16 is a bottom perspective view of the cable armor stop shown in FIG. 12.
Figure 17:
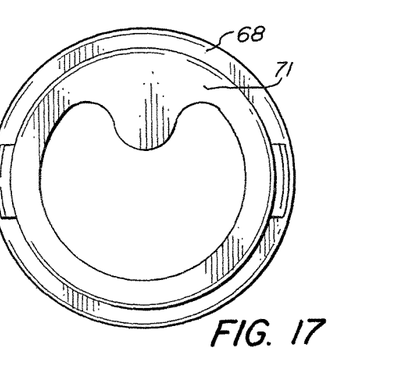
FIG. 17 is a rear view of the cable armor stop shown in FIG. 12.

FIGS. 8-11 illustrate how the radially protruding member 56 is able to block passage of cable sheathing 64 associated with AC/MC cables 66 of different outer diameter sizes. Thus, FIGS. 8 and 9 show a cross-sectional and a frontal partially broken away view of an electrical connector 79 with the associated cable armor stop 40 of the present invention. The electrical connector is dimensioned to receive AC/MC electrical cables having cable sheathing 64 outer diameters within a minimum to maximum range (for example, in a range from 0.420"-0.610"). In this example, the AC/MC cable 66 has a cable sheathing 64 with the maximum outer diameter and thus the cable sheathing 64 contacts the cable armor stop 40 near the outer periphery thereof. The electrical conductors 63 are able to easily pass through cavity 52 even though these electrical conductors may have significantly greater cross-sectional sizes than the electrical conductors 63 associated with a smaller outer diameter cable sheathing 64 associated with a minimum size AC/MC cable 66 in the range of sizes as seen in FIGS. 10 and 11. In FIGS. 10 and 11, the AC/MC cable 66 has a cable sheathing 64 with a minimum outer diameter and thus this cable sheathing contacts the radially protruding member 56 as seen in these figures.

Thus, it is seen that the cable armor stop of the present invention with its associated radially protruding member can accommodate a wide range of outer diameter cable sheathing sizes of associated AC/MC cable, while having a cavity 52 of sufficient size to accommodate not only the larger electrical conductors associated with the larger size AC/MC cable, but also the smaller electrical conductors 63 typically associated with the smaller size AC/MC cable.

As stated above, the perimeters 67 of the radially protruding member 56 and the interior surface 54 of the cable armor stop preferably are smooth as seen in FIGS. 1-3, 8 and 10 so as to minimize potential chaffing of the electrical conductors 63 of the associated AC/MC cable.

Cable armor stop 40 is preferable fabricated from electrical insulating material, such as plastic or the like.

Finally, as stated above, it should also be noted that electrical connector body 70 can secure the AC/MC cable sheathing 64 to the connector body by well-known means, such as via spring clip 67 as shown in applicant's U.S. Pat. No. 8,791,374, hereby incorporated by reference, or by other well-known means, including fastening bolts or the like (not shown).

Figure 1A:
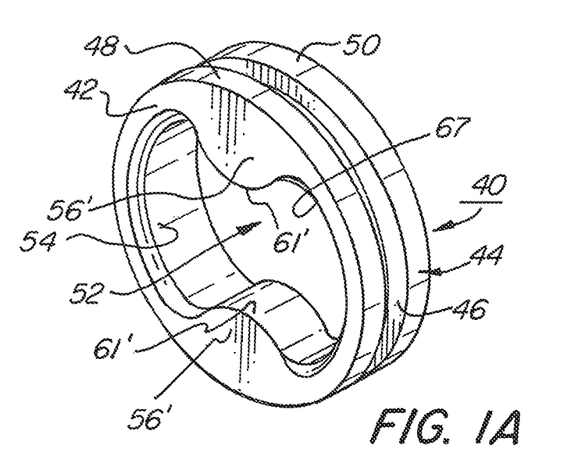
FIG. 1A is a perspective view of the cable armor stop similar to FIG. 1, but showing two radially protruding members.
Figure 2A:
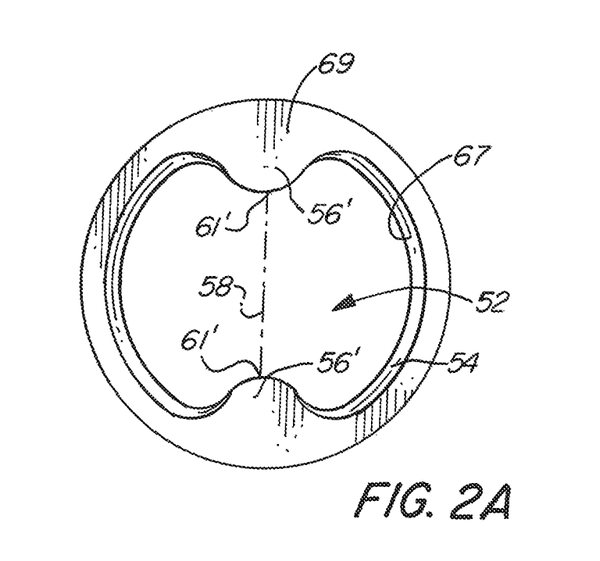
FIG. 2A is a front view of the cable armor stop shown in FIG. 1A.

As seen in FIGS. 1A and 2A, although the cable armor stop shown in FIGS. 1-11 has one radially protruding member 56, a cable armor stop 40* can have two radially protruding members 56' disposed on opposite sides of interior surface 54, with the terminating ends 61' of these radially protruding members having a distance 58 therebetween that is less than a minimum outside diameter cable sheathing to be inserted into the associated electrical connector. This embodiment is seen in FIGS. 1A and 2A. This embodiment is particularly effective for use with large diameter cables so as to reduce the extent each radially protruding member protrudes into the cavity of the body and therefore reduce the risk that a protruding member is broken when stopping a large size cable sheathing.

Figures 18, 19:
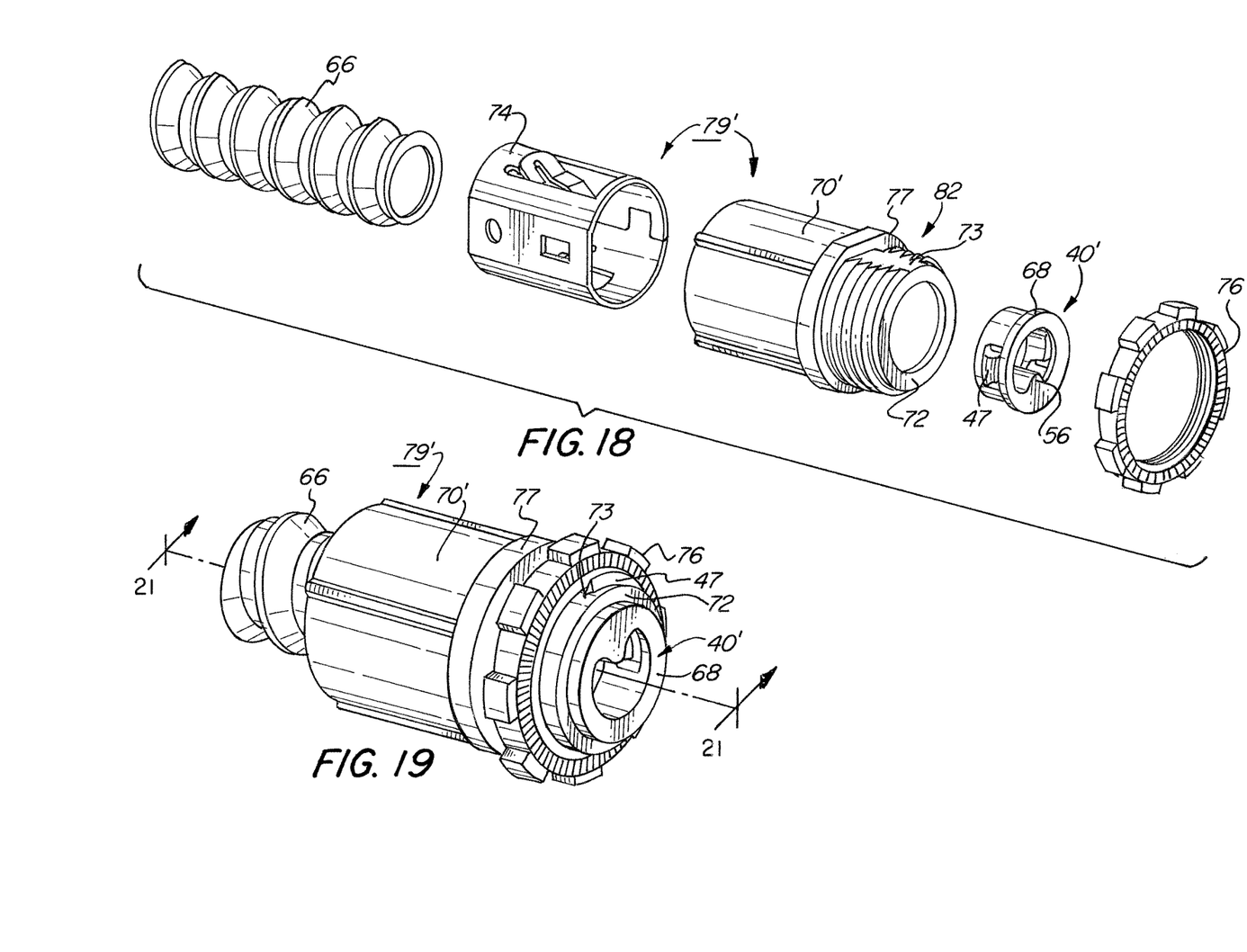
Figure 20:
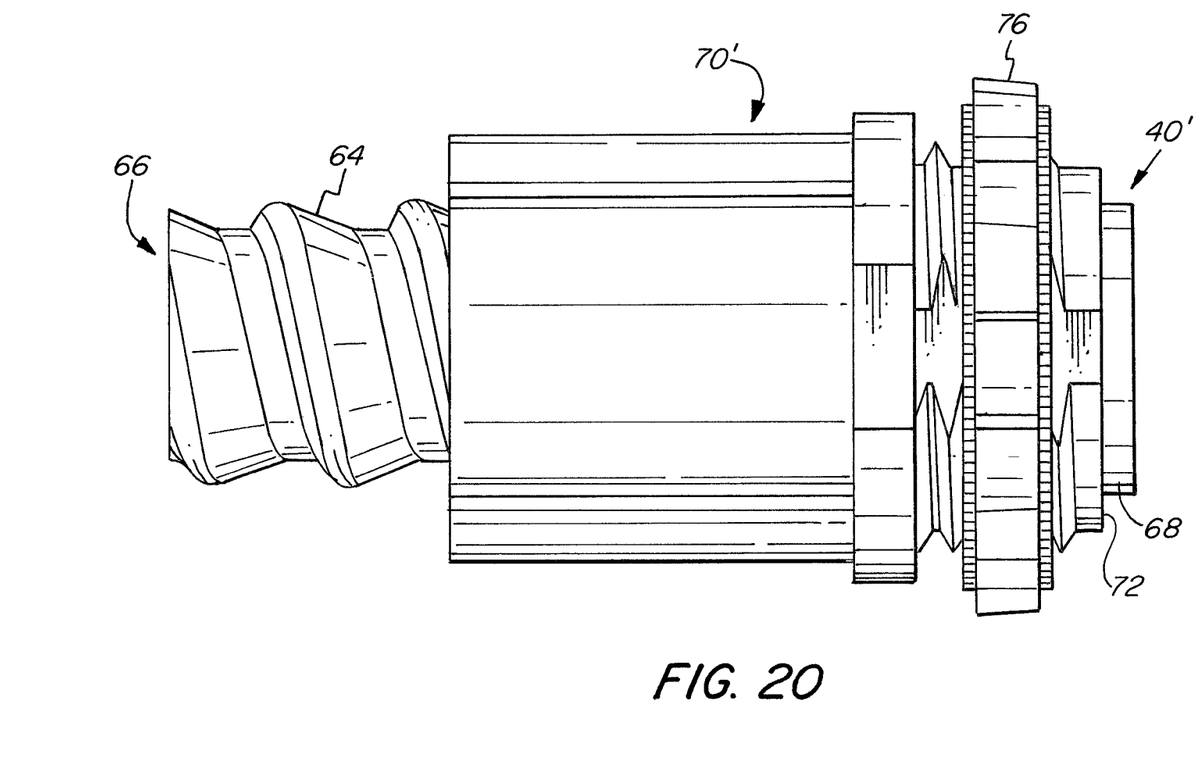
FIG. 20 is a side view of the assembled electrical connector, AC/MC cable, snap-in cable armor stop and locknut shown in FIG. 19.

FIGS. 12-21 show a second embodiment of a cable armor stop according to the present invention. As seen in FIGS. 12-17, this embodiment of the cable armor stop has a body 42' with an interior surface 54' similar to the embodiment shown in FIGS. 1 and 4. However, the outer shell 44' of this embodiment includes a region 45 that has a pair of movable tabs 47 which, as seen in FIGS. 18 and 19, are dimensioned to snap into a slotted region 73 in threaded nipple 82 of an electrical connector body 70'. Body 42' has a flange 68 that abuts with nipple end face 72 as best seen in FIGS. 18-21. This cable armor stop 40' also has a radially protruding member 56 similar to that shown for the embodiment of FIGS. 1-3. The operation of this cable armor stop is therefore the same as the embodiment shown in FIGS. 1-11 and is able to accommodate different outer diameter cable sheathing of AC/MC cable as discussed above with respect to the first embodiment of the present invention.

FIG. 18 shows that the electrical connector 79' can have an inner locking ring 74 so as to secure the AC/MC cable 66 thereto within a minimum to maximum range of cable sheathing outer diameters. Again, other ways of securing the outer sheathing of the AC/MC cable to the electrical connector are well-known in the art.

Figure 21:
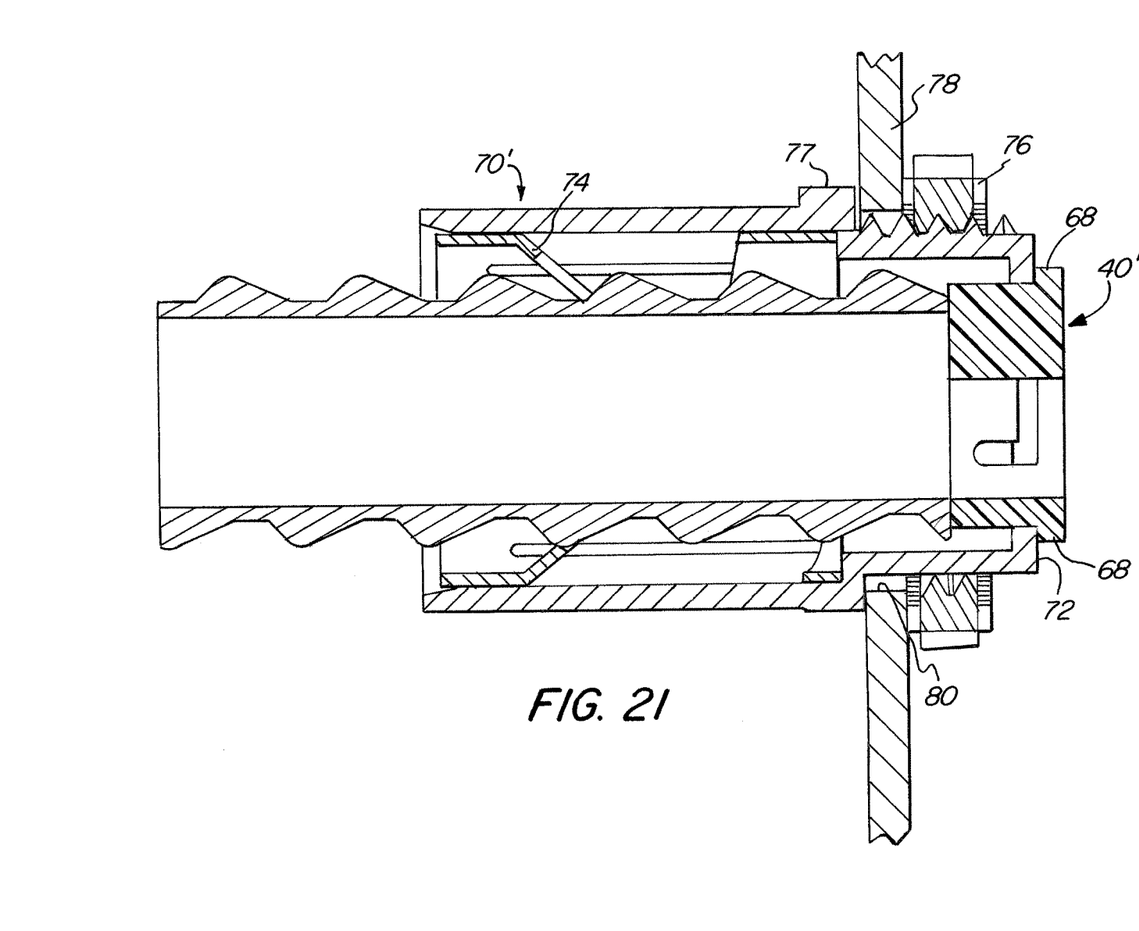
FIG. 21 is a cross-sectional view of the electrical connector, AC/MC cable snap-in cable armor stop and locknut taken along line 21-21 of FIG. 19, but further showing the electrical connector secured to an electrical panel box.
Figure 22:
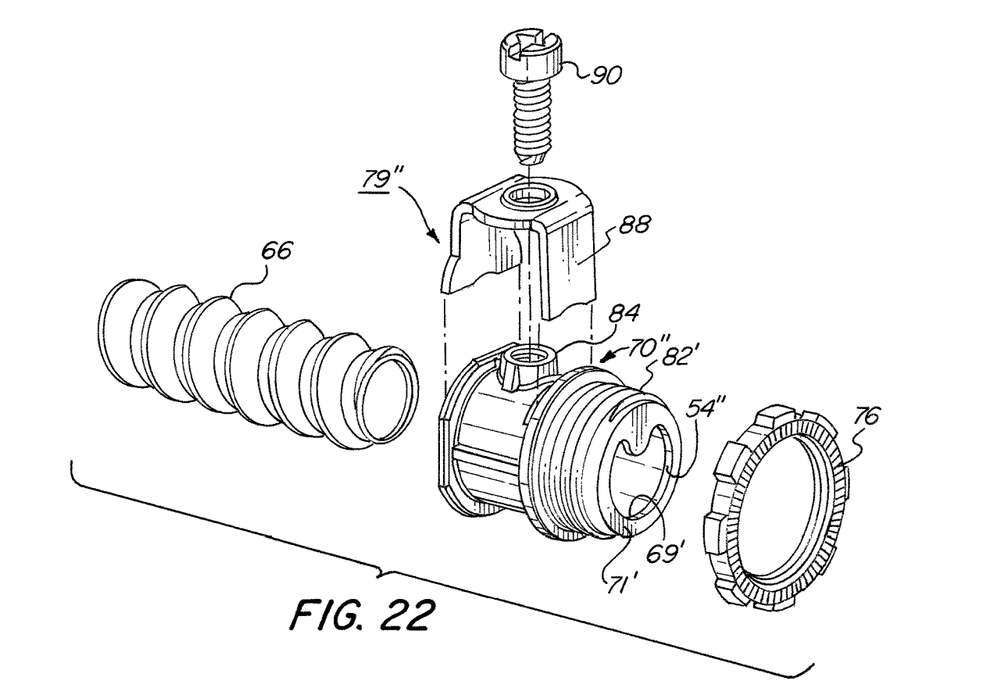
FIG. 22 is an exploded perspective view of another electrical connector embodiment having an integrated cable armor stop according to the present invention.
Figure 23:
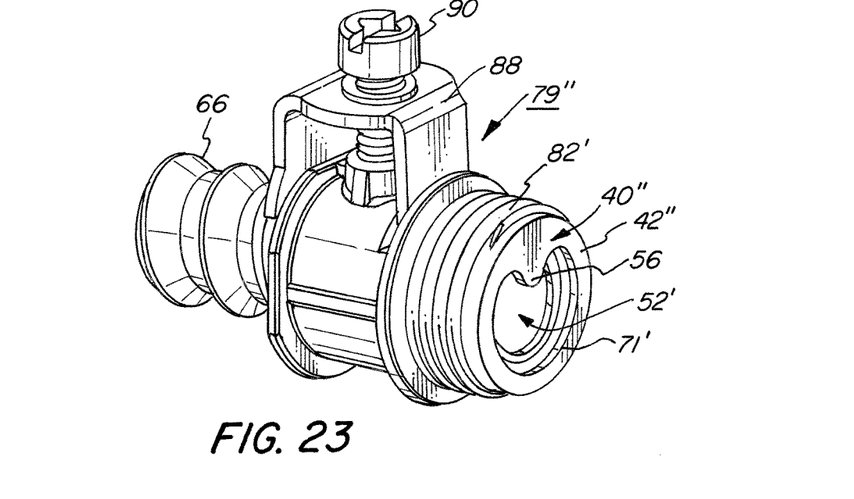
FIG. 23 is a perspective view similar to FIG. 22 showing the AC/MC cable assembled with the electrical connector.
Figure 24:
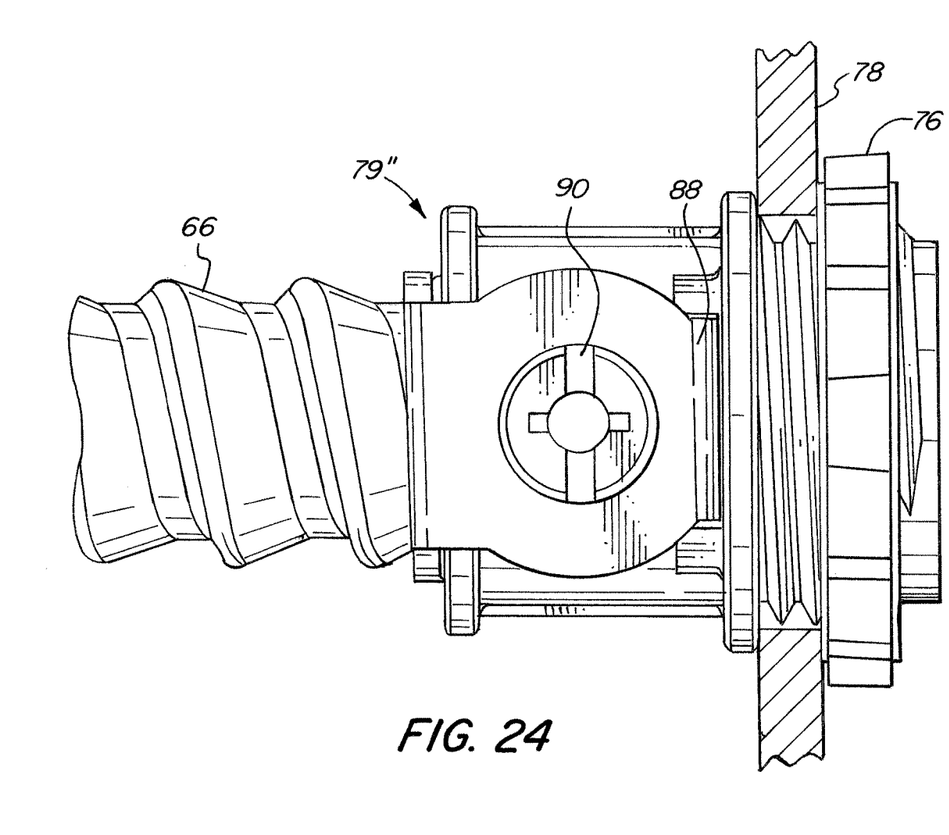
FIG. 24 is a top view of the electrical connector shown in FIG. 23.
Figure 25:
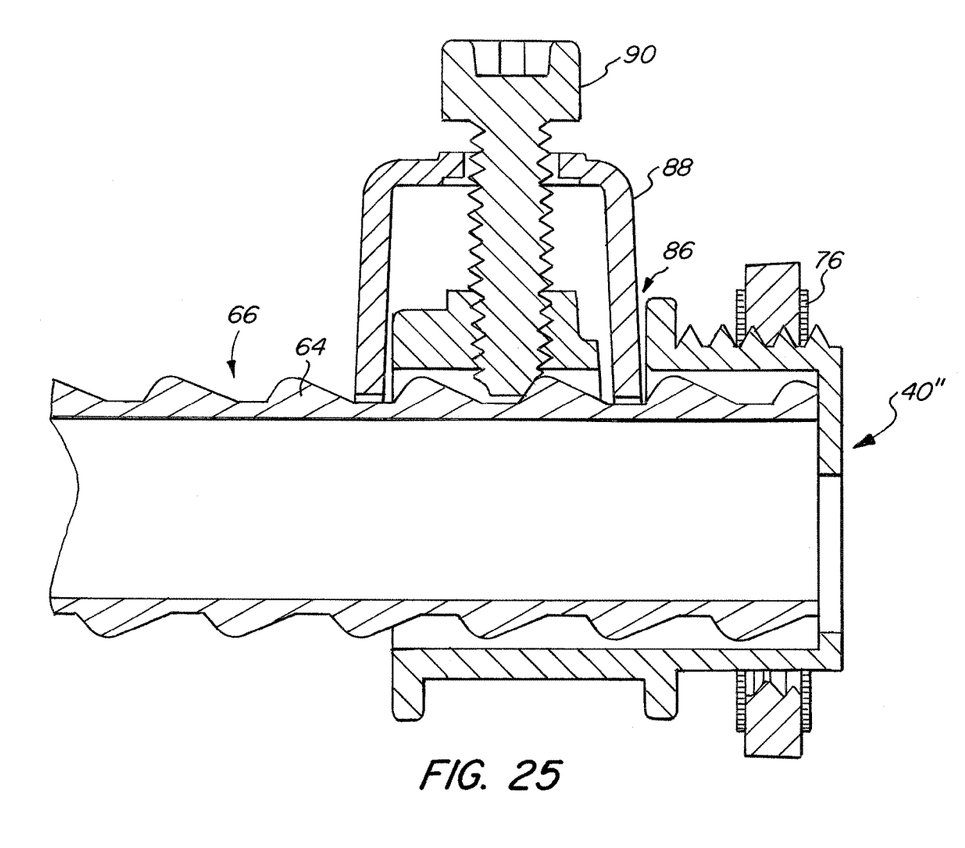
FIG. 25 is a cross-sectional view of the electrical connector shown in FIG. 23 illustrating the outer sheathing of the AC/MC cable secured to the electrical connector by a U-shaped retaining member.

This embodiment of the electrical connector also includes a locknut 76 and a flange 77 to secure the electrical connector to an electrical panel box 78 through associated knockout hole 80 as seen in FIG. 21. This embodiment of the cable armor stop is preferably fabricated from electrical insulating material, such as plastic or the like. This embodiment may also have two radially protruding members arranged as shown in FIGS. 1A and 2A.

FIGS. 22-25 show an electrical connector 79" with an electrical connector body 70" in which a cable armor stop 40" according to the present invention is integrally formed at the end of threaded nipple 82'. The armor stop has a body 42", the body having an interior cavity 52' formed by an interior surface 54" of the body, the cavity extending through the body between a front side 69' and a rear side 71' of the body and a radially protruding member 56 similar to the other embodiments of the present invention. The electrical connector body 70" in this embodiment is shown having a threaded boss 84, slot 86 and U-shaped retaining member 88 to secure the cable sheathing to the electrical connector via fastener 90. This embodiment may also have two radially protruding members arranged as shown in FIGS. 1A and 2A.

Thus, what has been described is a cable armor stop, which has a radially protruding member that extends inwardly from an interior surface defining a cavity of the armor stop such that a terminating end of the radially protruding member is positioned a distance from an opposite side of the interior surface closest to the terminating end that is less than a minimum outside diameter of a cable sheathing of an AC/MC cable for which an associated electrical connector is sized. In this manner, a range of cable sheathing outer diameter sizes can be accommodated by the armor stop while allowing the larger size electrical conductors associated with the larger sized AC/MC cables to pass through the cavity while also preventing a smaller AC/MC cable sheathing from passing the armor stop, yet still allowing its electrical conductors to freely pass through the armor stop.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A cable armor stop comprising:
a body having an outer shell with a cylindrical shape dimensioned to engage with an electrical connector, the body having an interior cavity formed by an interior surface of the body, the cavity extending through the body between a front side of the body and a rear side of the body, the cavity generally cylindrical in shape with a maximum cross-sectional diameter sufficient for the body to contact a cable sheathing of an electrical cable with a maximum cable sheathing outer diameter in a predetermined range of electrical cables with cable sheathing outer diameters between said maximum cable sheathing outer diameter and a minimum cable sheathing outer diameter, the cavity reduced by a radially protruding member extending inwardly such that a terminating end of said radially protruding member is spaced a distance from an opposite side of the interior surface closest to said terminating end so that said radially protruding member contacts the cable sheathing of an electrical cable with the minimum cable sheathing outer diameter so as to prevent passage of the cable sheathing having said minimum cable sheathing outer diameter and so that the cavity is of sufficient size to accommodate electrical conductors associated with electrical cables with said maximum cable sheathing outer diameter as well as electrical conductors associated with electrical cables with said minimum cable sheathing outer diameter.

2. The cable armor stop according to claim 1, wherein the radially protruding member has a smooth shape.

3. The cable armor stop according to claim 2, wherein the shape of the radially protruding member does not have small radii that could impede passage or chaffing of electrical conductors.

4. The cable armor stop according to claim 1, wherein the shape of the radially protruding member corresponds to a palatine uvula.

5. The cable armor stop according to claim 1, wherein the outer shell of the body is formed with an annular groove dimensioned for interfitment with a tongue formed on a U-shaped member of an electrical connector body of the electrical connector so as to secure the cable armor stop to the electrical connector.

6. The cable armor stop according to claim 5, wherein the shape of the radially protruding member corresponds to a palatine uvula.

7. The cable armor stop according to claim 5, wherein a perimeter of the interior surface of the body at both the front side and rear side of the body, and a perimeter of the radially protruding member, are smooth so as to minimize abrasion of electrical conductors passing thereby.

8. The cable armor stop according to claim 7, wherein the shape of the radially protruding member corresponds to a palatine uvula.

9. The cable armor stop according to claim 7, fabricated from an electrical insulating material.

10. The cable armor stop according to claim 9, wherein the insulating material is plastic.

11. The cable armor stop according to claim 1, wherein the outer shell includes at least two movable tabs dimensioned for insertion within slots formed in an electrical connector body of the electrical connector at one end of the electrical connector body.

12. The cable armor stop according to claim 11, wherein the shape of the radially protruding member corresponds to a palatine uvula.

13. The cable armor stop according to claim 11, wherein a perimeter of the interior surface of the body at both the front side and rear side of the body, and a perimeter of the radially protruding member, are smooth so as to minimize abrasion of electrical conductors passing thereby.

14. The cable armor stop according to claim 13, wherein the shape of the radially protruding member corresponds to a palatine uvula.

15. The cable armor stop according to claim 13, fabricated from an electrical insulating material.

16. The cable armor stop according to claim 15, wherein the insulating material is plastic.

17. The cable armor stop according to claim 1, wherein the cavity of the body is reduced by two radially protruding members with terminating ends of said radially protruding members facing each other and spaced a distance from each other less than said minimum cable sheathing outer diameter.

18. The cable armor stop according to claim 17, wherein the shape of each radially protruding member corresponds to a palatine uvula.

19. The cable armor stop according to claim 1, wherein the predetermined range of electrical cables have cable sheathing outer diameters between approximately 0.42 inch and 0.61 inch.

20. An electrical connector comprising:
a body having a nipple formed at one end thereof, the nipple including a cable armor stop formed at one end of the nipple, the cable armor stop having a body, the body of the cable armor stop having an interior cavity formed by an interior surface of the body, the cavity extending through the body of the cable armor stop between a front side of the body and a rear side of the body, the cavity generally cylindrical in shape with a maximum cross-sectional diameter sufficient for the body to contact a cable sheathing of an electrical cable with a maximum cable sheathing outer diameter in a predetermined range of electrical cables with cable sheathing outer diameters between said maximum cable sheathing outer diameter and a minimum cable sheathing outer diameter, the cavity reduced by a radially protruding member extending inwardly such that a terminating end of said radially protruding member is spaced a distance from an opposite side of the interior surface closest to said terminating end so that said radially protruding member contacts the cable sheathing of an electrical cable with the minimum cable sheathing outer diameter so as to prevent passage of the cable sheathing having said minimum cable sheathing outer diameter and so that the cavity is of sufficient size to accommodate electrical conductors associated with electrical cables with said maximum cable sheathing outer diameter as well as electrical conductors associated with electrical cables with said minimum cable sheathing outer diameter.

21. The electrical connector according to claim 20, wherein the electrical connector body has a threaded boss and a slot formed in the body, and the electrical connector has a U-shaped retaining member dimensioned to secure the cable sheathing to the electrical connector body when a fastener is threaded into said boss, with the U-shaped retaining member having a portion passing through said slot.

22. The electrical connector according to claim 21, wherein the radially protruding member has a smooth shape.

23. The electrical connector according to claim 22, wherein the shape of the radially protruding member does not have small radii that could impede passage or chaffing of electrical conductors.

24. The electrical connector according to claim 23, wherein the shape of the radially protruding member corresponds to a palatine uvula.

25. The electrical connector according to claim 20, wherein the shape of the radially protruding member corresponds to a palatine uvula.

26. The electrical connector according to claim 20, wherein the cavity of the body is reduced by two radially protruding members with terminating ends of said radially protruding members facing each other and spaced a distance from each other less than said minimum cable sheathing outer diameter.

27. The electrical connector according to claim 26, wherein the shape of each radially protruding member corresponds to a palatine uvula.

28. The electrical connector according to claim 20, wherein the predetermined range of electrical cables have cable sheathing outer diameters between approximately 0.42 inch and 0.61 inch.

* * * * *